United States Patent
Gigas et al.

(10) Patent No.: US 7,328,809 B2
(45) Date of Patent: Feb. 12, 2008

(54) SOLVENT EXTRACTION METHOD AND APPARATUS

(75) Inventors: Bernd Gigas, Churchville, NY (US); Michael Giralico, Rochester, NY (US)

(73) Assignee: SPX Corporation, Charlotte, NC (US)

( * ) Notice: Subject to any disclaimer, the term of this patent is extended or adjusted under 35 U.S.C. 154(b) by 288 days.

(21) Appl. No.: 10/644,739

(22) Filed: Aug. 21, 2003

(65) Prior Publication Data

US 2005/0040106 A1    Feb. 24, 2005

(51) Int. Cl.
*B01D 17/028* (2006.01)

(52) U.S. Cl. .................. 210/521; 210/522; 210/532.1; 210/538; 210/540; 422/256

(58) Field of Classification Search .................. 210/97, 210/511, 519, 521, 522, 532.1, 538, 540, 210/634, 799, 800–802, DIG. 5; 422/256–259
See application file for complete search history.

(56) References Cited

U.S. PATENT DOCUMENTS

| | | | | |
|---|---|---|---|---|
| 2,817,440 A | * | 12/1957 | Casner et al. | 209/208 |
| 3,216,573 A | * | 11/1965 | Irion | 210/220 |
| 3,820,954 A | * | 6/1974 | Stonner et al. | 210/521 |
| 4,333,835 A | * | 6/1982 | Lynch | 210/305 |
| 4,422,931 A | * | 12/1983 | Wolde-Michael | 210/168 |
| 5,066,407 A | * | 11/1991 | Furlow | 210/744 |
| 5,520,825 A | * | 5/1996 | Rice | 210/802 |
| 5,989,415 A | * | 11/1999 | Hirs | 210/138 |
| 6,019,898 A | * | 2/2000 | Johnson | 210/260 |

* cited by examiner

*Primary Examiner*—Joseph Drodge
(74) *Attorney, Agent, or Firm*—Baker & Hostetler LLP

(57) ABSTRACT

A weir assembly for use with a mixer-settler for liquid-liquid extraction includes in one embodiment an organic weir having an inlet opening below the free surface of the organic phase liquid and a vertically-adjustable front wall allowing adjustments in the position and/or height of the inlet opening. The organic weir can also feature an angled bottom coupled to a lip segment, an incline plate in the interior of the weir, and a front wall that is angled with respect to incoming fluid flow. In another embodiment the weir assembly can independently or additionally include an aqueous weir with a labyrinth section. The aqueous weir can optionally include an adjustable lip hingedly coupled to the top of the final partition in the labyrinth section.

17 Claims, 5 Drawing Sheets
(2 of 5 Drawing Sheet(s) Filed in Color)

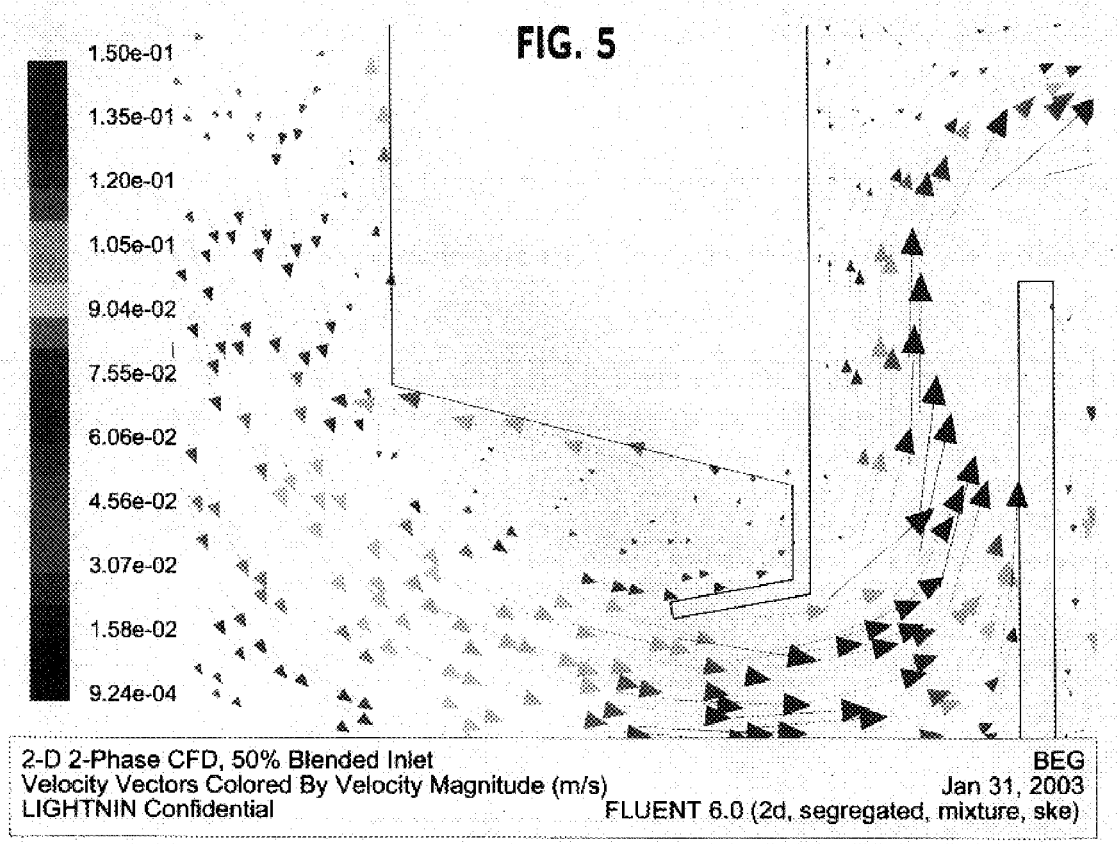

SOLVENT EXTRACTION METHOD AND APPARATUS

FIELD OF THE INVENTION

The present invention relates generally to a method and apparatus for solvent extraction. More particularly, the present invention relates to an improved weir assembly to alleviate cross-phase contamination in mixer-settlers.

BACKGROUND OF THE INVENTION

Liquid-liquid extraction can be used for the recovery of solutes in an aqueous system. Liquid-liquid extraction generally employs the principle of contacting a solute-bearing aqueous liquid, with an organic liquid having an affinity for the solutes. The liquid and organic phase are first mixed to promote transfer of solute from the aqueous to the organic phase, and then allowed to coalesce and settle by gravity whereupon at least a portion of the solute is now dispersed in the organic extractant phase.

Mixer-settlers can be used for liquid-liquid extraction. Mixer-settlers typically include a mixing chamber and a settling chamber. The organic extractant liquid and the aqueous liquid are normally mixed in the mixing chamber and then overflow into the settling chamber, where the phases are allowed to separate. The end of the settling chamber can include two weirs to separate out the liquid phases. Specifically, the lighter organic phase overflows into a first weir having an opening at the top of the tank, and the heavier aqueous phase flows into a second weir having an opening at the bottom of the tank. A schematic of such a conventional overflow-mixer settler is provided in FIG. 1.

A drawback associated with the conventional mixer-settler design described above is that of cross-contamination of the phases. That is, organic fluid entrained in the aqueous fluid can flow into the aqueous weir. Another drawback associated with such current mixer-settler designs is air entrainment, which is a source of "crud." Air entrainment occurs because standard organic weirs are overflow, that is the top of the organic phase overflows into the top of the organic weir.

Accordingly, it is desirable to provide a mixer-settler apparatus that alleviates cross-contamination of phases and/or air entrainment. It is also desirable to provide a method for liquid-liquid extraction in mixer-settlers that alleviates cross-contamination of phases and/or air entrainment.

SUMMARY OF THE INVENTION

The foregoing needs are met, to a great extent, by the present invention, wherein in one aspect novel mixer-settler weir assemblies configured to address the problem of cross-contamination and/or air entrainment are provided.

In accordance with one embodiment of the present invention, an apparatus for liquid-liquid extraction is provided. The apparatus includes a settler compartment for coalescing a first lighter liquid phase from a second heavier liquid phase, a first weir located in the settler compartment for collecting the first liquid phase, and a second weir also located in the settler compartment for collecting the second liquid phase. The first weir has in inlet opening which is positioned below the free surface level of the first liquid phase and through which the first liquid phase flows into the first liquid phase weir. The second weir, which is located adjacent to the first weir, has a labyrinth section which includes an inlet to the second weir as well as a first and second partition extending from the bottom of the settler compartment, and a third partition located between the first and second partition and extending from the top of the settler compartment. In some embodiments, the front wall of the first weir is vertically adjustable so that the height and/or the location of the first weir inlet opening can be adjusted. In some embodiments, the first weir has an inclined bottom such that the bottom back side of the first weir is closer to the settler compartment bottom than the bottom front side of the first weir and the first weir further includes a lip protruding from the bottom back side of the first weir toward the settler compartment bottom. In some embodiments, the front side of the front wall of the first weir forms a non-perpendicular angle with the side wall of the settler compartment. In the context of the present application, a person of ordinary skill will understand that "lighter" and "heavier" do not denote any specific density but are merely relative terms to suggest that one liquid phase is lighter or heavier than another liquid phase.

In accordance with another embodiment of the present invention, an apparatus is provided from liquid-liquid extraction, which apparatus includes a compartment means for coalescing an organic phase from an aqueous phase, a first weir means for collecting the coalesced organic phase, and a second weir means for collecting the coalesced aqueous phase. The first weir means is located in the compartment means, and the second weir means is also located in the compartment means, adjacent to the first weir means. The first weir means includes an inlet opening means for reducing air entrainment. In this context, "reducing air entrainment" means that air entrainment is reduced as compared to air entrainment that occurs in conventional mixer-settler organic weirs wherein the top of the organic phase overflows into the top of the organic weir. In some embodiments, the second weir means includes a labyrinth means for enabling at least a portion of organic phase which is entrained in the aqueous phase to rise into a quiescent portion of the labyrinth means and thereby separate from the aqueous phase.

In accordance with yet another embodiment of the present invention, a method for solvent extraction is provided which includes mixing an organic liquid system with an aqueous liquid system, coalescing the mixed organic and aqueous liquid systems into an organic phase and an aqueous phase, and collecting the organic phase in an organic weir and the aqueous phase into an aqueous weir. Both weirs are located in the settler compartment adjacent one another. The organic weir includes a front wall with an inlet opening located below the free liquid surface of the organic phase and the second weir includes a labyrinth section for enabling at least apportion of the organic phase entrained in the aqueous phase to separate from the aqueous phase by rising into a quiescent portion of the labyrinth section.

It should be understood that when reference is made to "collecting" a liquid phase, whether it is specifically identified as organic or aqueous or generically identified as first or second, the phase collected may not be pure. That is, for example, some of the aqueous phase may be entrained in the organic phase and vice versa. Similarly, it should be understood that when reference is made to separating phases, be it the aqueous and organic phase or first and second phase, the separation may not be 100% effective. That is, for example, some of the aqueous phase may be entrained in the organic phase and vice versa. In fact, a person of ordinary skill will appreciate that given the current state of technology, the "collection" of each phase would not be expected to collect a pure phase and the separation of the phases would not be expected to completely separate the phases. However, certain embodiments according to this invention are designed to alleviate cross-contamination of phases that occurs in conventional overflow mixer-settler units and thus result in a more pure collection, or a better separation as compared to conventional overflow mixer-settlers.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIG. 5 is a color photograph illustrating the flow direction and speed of fluid that occurs in a mixer-settler comprising the weir assembly of FIG. 2.

DETAILED DESCRIPTION

Figure 1:
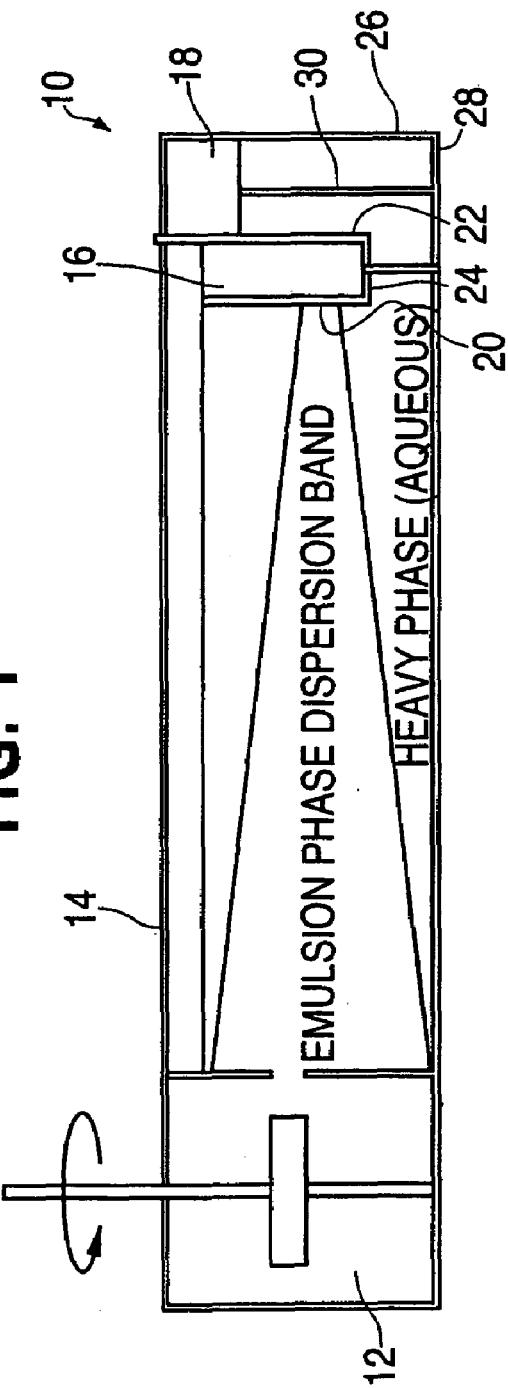
FIG. 1 is a cross-sectional schematic of a conventional overflow mixer-settler.

The invention will now be described with reference to the drawing figures, in which like reference numerals refer to like parts throughout. A weir assembly for use in mixer-settlers is provided which includes a first weir for collecting a first lighter liquid phase and a second weir for collecting a second heavier liquid phase. The first weir includes an inlet opening located below the free liquid surface and the second weir includes a labyrinth portion for further separation of the first liquid phase from the second liquid phase. Such weir assemblies can reduce air entrainment and increase separation of phases as compared to the conventional overflow mixer-settler illustrated in FIG. 1 and described above in the background section of the present specification.

FIG. 1 illustrates a conventional mixer-settler 10. The mixer-settler includes a mixer compartment 12 and a settler compartment 14. A light phase or organic weir 16 and a heavy phase or aqueous weir 18 are located within the settler compartment 14. The organic weir 16 is formed by a front wall 20, a back wall 22 and bottom 24. The aqueous weir 18 is also formed by a front wall 22 (the front wall of the aqueous weir is the same as the back wall of the organic weir), a back wall 26 (which is also the back wall of the settler compartment 14), and a bottom 28 (which is also the bottom wall of the settler compartment 14). In addition, the aqueous weir includes a partition 30 extending from the bottom of the settler compartment 14 partway into the interior of the aqueous weir 18 and is located between the front wall 22 and the back wall 28. Each of the walls 20, 22, 26 and the partition 30 is perpendicular to the bottom of the settler compartment 14, and the bottom of the organic weir 24 is parallel to the bottom of the settler compartment. As illustrated, the separated organic phase overflows into the organic weir 16 at the top of the settler compartment 14, and aqueous phase flows into the aqueous weir 18 at the bottom of the settler compartment 14.

Figure 2:
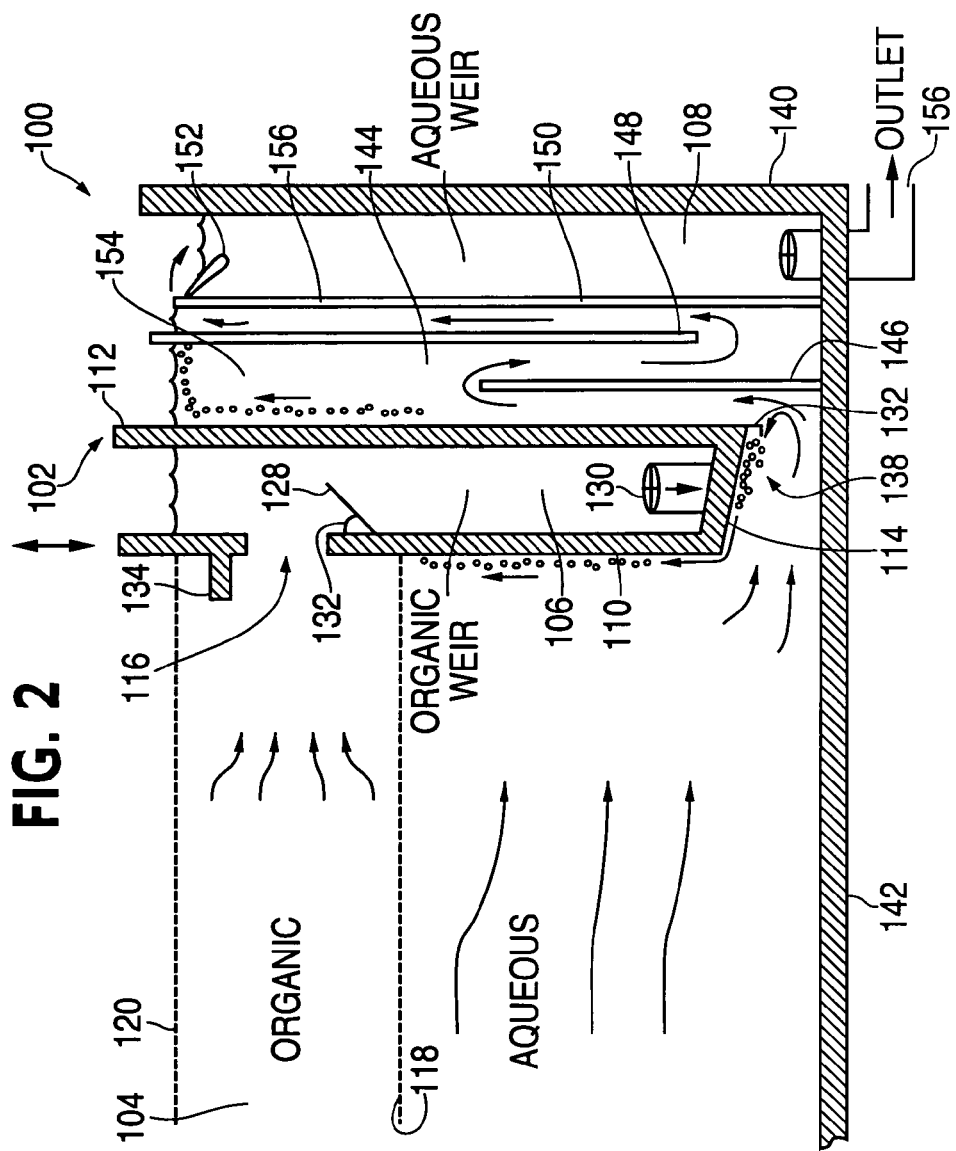
FIG. 2 is a cross-sectional schematic view illustrating a weir assembly, for use in a mixer-settler, according to a preferred embodiment of the invention.
Figure 3:
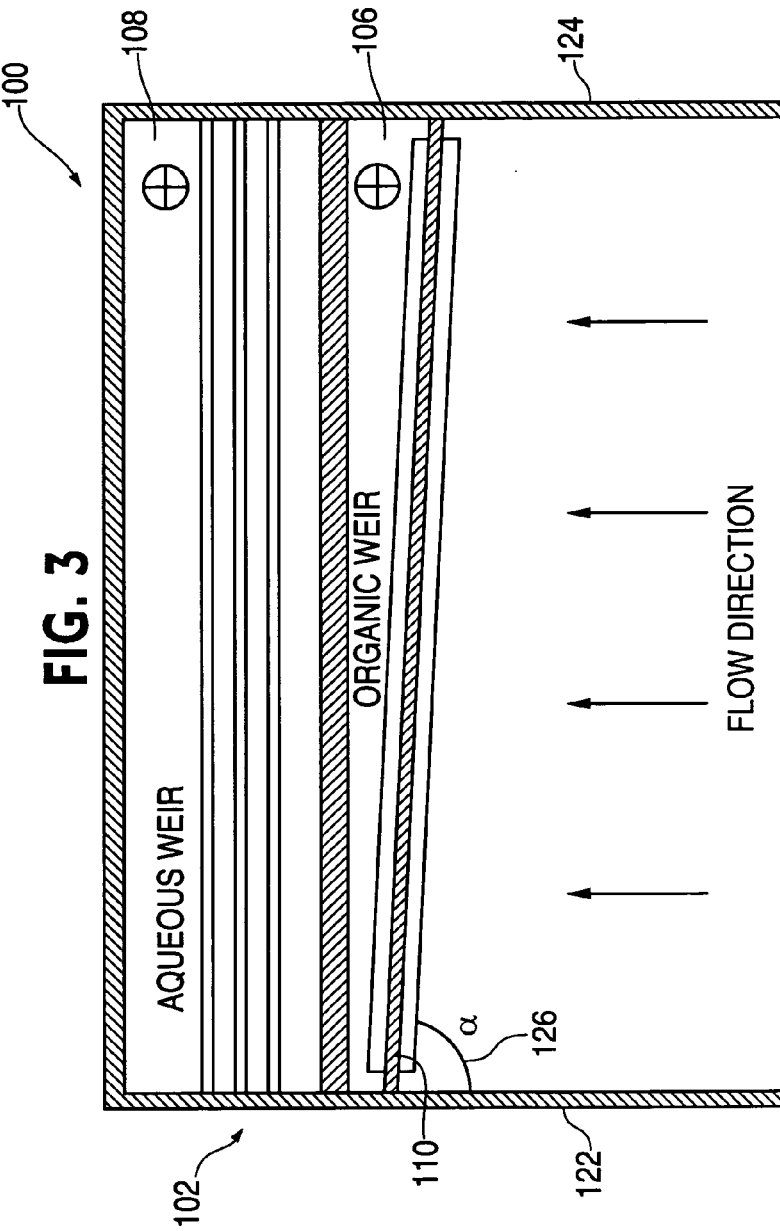
FIG. 3 is a top cross-sectional view of the weir assembly of FIG. 2.

FIGS. 2 and 3 illustrate a mixer-settler 100 having a weir assembly 102 in accordance with an embodiment of the present invention. Whereas FIG. 2 is a side cross-sectional view, FIG. 3 shows a top cross-sectional view of the illustrated embodiment. The mixer-settler 100 includes a mixer compartment (not shown) and a settler compartment 104. The weir assembly 102, which is located in the settler compartment 104, and is partially formed by walls of the settler compartment 104, includes a first weir 106 and a second weir 108. Typically, the mixer-settler separates an organic liquid phase from an aqueous liquid phase. As the organic liquid phase is typically lighter than the aqueous liquid phase, the first weir typically collects organic phase and is thus often referred to as an organic weir, and the second weir typically collects aqueous phase and is thus often referred to as an aqueous weir. For ease in description, the mixer-settler apparatus will be described as extracting an organic liquid from an aqueous liquid, wherein the organic liquid is heavier than the aqueous liquid, and consequently the first weir 106 will be referred to as an organic weir and the second weir 108 will be referred to as an aqueous weir. However, it should be understood that the mixer-settler is not limited for use in extracting a heavier organic phase from a lighter aqueous phase and consequently the first weir is not limited to collection of organic phase and the second weir is not limited to collection of aqueous phase. Rather, for any liquid-liquid extraction involving a first liquid and a second liquid, the first weir should collect the lighter liquid and the second weir should collect the heavier liquid.

The organic weir 106 has a front wall 110, a back wall 112, and a bottom wall 114. Optionally, the settler compartment 104 can include a top (not shown in the illustrated embodiment), which can form a top wall of the organic weir 106. In one embodiment (not illustrated) the front wall 110 and back wall 112 are equal in length and thus the front wall 110 and back wall 112 are perpendicular to both the top of the settler compartment 104 and the bottom wall 114 of the organic weir 106. Consequently, the bottom wall 114 of the organic weir 106 is parallel to the bottom of the settler compartment 104. In the embodiment illustrated, however, the front wall 110 extends a first distance from the top end of the settler compartment 104 into the interior of the settler compartment 104 and the second wall 112 extends a second, longer distance from the top end of the settler compartment 104 into the interior of the settler compartment 104. Thus, although the front wall 110 and the back wall 112 are perpendicular to the top wall of the settler compartment 104, they are not perpendicular to the bottom wall 114 of the organic weir 106. Rather, the bottom wall 114 of the organic weir 106 is angled downward toward the back wall 140 of the settler compartment 104 such that the back end of the bottom wall 114 is closer to the bottom of the settler compartment 104 than the front end of the bottom wall 114.

As best shown in FIG. 3, optionally, the front wall 110 of the organic weir 106 can be fitted into the settler compartment 104 at a non-perpendicular angle relative to the left and right sides 122, 124 of the settler compartment so that the organic weir 106 is set at an angle 126 to the incoming fluid flow. Such an arrangement can result in preferential flow channeling to the far corner of the settler compartment, allowing a single location for crud removal. By contrast, straight across weirs means the entire length of the weir can require crud removal. As such, it is unimportant whether the front wall 110 is angled to bias the flow to the left or right (thereby collecting crud at the left or right) sides of the settler compartment 104. The side chosen will generally depend on where the crud can be most conveniently removed. In some embodiments, the angle preferably ranges from about 75 to about 105 degrees. In some embodiments, the angle preferably ranges from about 87 to 93 degrees. In some embodiments the angle is preferably 89 or 91 degrees. To accomplish a similar result, the front wall 110 could alternatively have, for example, a triangular form whereby the back side of the front wall 110 is perpendicular to the left and right sides 122, 124 of the settler compartment 104 but the front side forms an angle with the sides 122, 124 of the settler compartment 104.

The front wall 110 includes an inlet opening 116, which is located above the organic-aqueous interface 118 but below the free surface 120 of the organic phase. The front wall 110 is preferably vertically adjustable such that vertically adjusting the front wall results in an adjustment to the height and/or the location of the inlet opening 116. In this way, the flow of organic phase into the organic weir 106 can be maintained under the free liquid surface, eliminating or alleviating the possibility of air entrainment, a source of unwanted "crud."

The organic weir 106 can optionally include, among other features, an incline plate 128, a riser 130, a sump (not shown), a tap (not shown), a lip 132 protruding from the bottom wall 114, and a lip 134 protruding from the front wall. The incline plate functions to redirect incoming fluid flow into the organic weir 106 upward. The purpose of this redirect is to enable recirculation of material above the organic weir inlet 116 and thus avoid or alleviate stagnation of material above the weir inlet 116. The incline plate 128 can work together with the adjustably vertical front wall feature for this purpose. The incline plate 128 is attached to the interior of the organic weir at an upward angle 132 (i.e. the incline plate 128 points upward to the top of the settler compartment 104). Preferably, the angle of attachment 136 ranges from about 30 degrees to about 65 degrees. More preferably, the angle 136 is about 45 degrees. Preferably, the incline plate 128 is located just below the bottom of the inlet opening 116 and extends so that the tip of the incline plate 128 reaches at least the same level as the bottom of the inlet opening 116.

The riser 130, sump, and tap can operate to further increase separation of organic and aqueous phase. The riser 130, for example, can be a pipe or relatively small dimension as compared to the dimensions of the organic weir. For example, the riser 130, which is positioned at the bottom of the organic weir 106, can be a pipe having a length ranging from about 6 to about 8 inches in length and can have a diameter ranging from about 5 to about 8 inches. The purpose of the riser 130 is to capture overflow organic phase. Entrained aqueous phase will sink to the bottom of the organic weir 106, thus the riser, which extends a distance above the bottom of the organic weir 106 should fill with less aqueous phase than the fluid areas below and around the riser 130. A sump is preferably placed at the lowest point in the organic weir 106 to collect aqueous phase settling out of the organic phase, and a small tap can be used to drain this aqueous phase liquid and either feed it to recycle or waste.

The lip 132 protruding from the bottom wall 114 of the organic weir 106 cooperates with the angled bottom wall 114 to prevent or alleviate the problem of entrained organic phase entering the aqueous weir 108. FIG. 5 is a computer model illustrating the direction and speed of fluid flow, and shows incoming fluid along the bottom wall 114 of the organic weir 106 being redirected upward, away from the entrance 138 of the aqueous weir 108. Design of the angle and lip shape for individual flow rates can be accomplished using CFD.

The lip 134 protruding from the front wall 110 of the organic weir 108 is intended to reduce air entrainment. Without the lip 134, the fastest velocities of incoming fluid are at the surface of the fluid. When surface fluid hits the front wall 110, it can be redirected downward and bring with it entrained air. The lip 134, which is preferably attached at a right angle to the front wall 110 and is located above the inlet opening 116 can slow down the flow of this downwardly moving fluid and thereby alleviate or avoid air entrainment.

The aqueous weir 108 is defined by the back wall 140 of the settler compartment 104, the bottom 142 of the settler compartment 104, and the back wall 112 of the organic weir 106, and includes a labyrinth section 144 formed by three partitions 146, 148, 150, and an outlet 156 for removing collected aqueous phase. The entrance 138 of the aqueous weir 108 is the space formed between the bottom 142 of the settler compartment 104 and the bottom of the back wall 112 of the organic weir 106.

The labyrinth section 144 includes first and second partitions 146, 150 which extend from the bottom 142 of the settler compartment 104 into the interior of the settler compartment 104 and a third partition 148 between the first and second partitions 146, 150 which extends from the top of the settler compartment 104 into the interior of the settler compartment 104. The partitions 146, 148, 150 are partial walls, in that they do not extend the entire height of the settler compartment 104, but rather allow fluid entering the aqueous weir 108 to flow around them and into the final section 156 of the aqueous weir 108. The labyrinth section 144 is designed to allow entrained organic to rise in the quiescent section 154. To accomplish this, the spacing and height of the partitions 146, 148, 150 is determined using common rules of hydraulics to achieve a desired pressure drop. Preferably, the pressure drop ranges from about ¼" to about 1½". Thus, as fluid enters the aqueous weir 108 and is redirected upward by the first partition 146, entrained organic preferably continues to rise upward into the quiescent portion 154, whereas aqueous phase preferably flows downward, around the first partition 146.

The aqueous weir 108 can also include an adjustable lip 152 hingedly connected at the top of the third partition 150, terminating below the free surface level of the final section 156 of the aqueous weir 108. The purpose of the adjustable lip 152 is to reduce air entrainment, particularly as compared to the conventional mixer-settler of FIG. 1, in which fluid simply cascades into the final section of the aqueous weir. Adjustments to the angle of the lip can effect the flow rate of the liquid. As the angle is reduced, splash is reduced and thus too introduction of air into the system. Although in the illustrated embodiment, the adjustable lip is shown with an airplane wing shape, a person of ordinary skill will appreciate that numerous different shapes can be used and the more preferred shapes assist in slowing the liquid flow.

Figure 4:
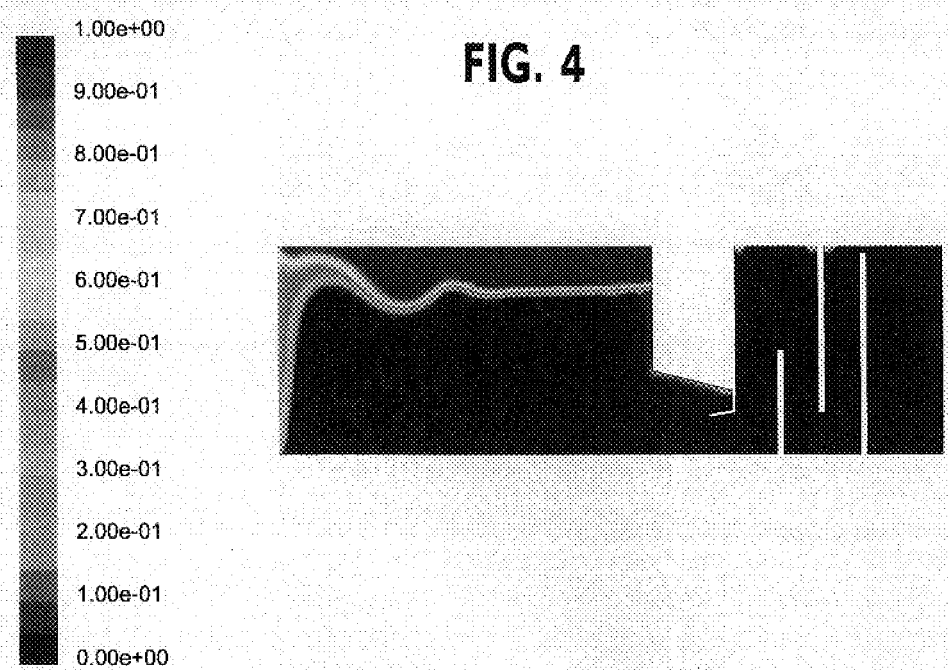
FIG. 4 is a color photograph illustrating the separation of phases that occurs in a mixer-settler containing the weir assembly of FIG. 2.

FIGS. 4 and 5 are computer generated models depicting the effectiveness of weir assemblies according to the present invention. FIG. 4 illustrates that successful separation of phases is accomplished. At the front end of the settler compartment, the green color illustrates the mixed organic and aqueous phases. The central portion of the settler compartment indicates that the aqueous phase (blue) and organic phase (orange) have coalesced. Finally, the figure indicates that the aqueous weir portion 108 includes almost exclusively aqueous phase, other than crud which has risen into quiescent portions of the labyrinth section of the aqueous phase. FIG. 5 illustrates the direction and speed of flow of fluid around the entryway to the aqueous weir, longer arrows indicated faster flow, thicker arrows indicating heavier fluid. As is apparent from the computer model, the combination of the angled organic weir bottom plus lip is successful in redirecting entrained organic away from the entrance of the aqueous weir.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. An apparatus for liquid-liquid extraction configured to accommodate at least a first, organic, liquid phase and a second, aqueous, phase, the apparatus comprising:
   a container having a bottom container wall, a container end, with the second container end having a rear container end wall, wherein the container is adapted for material flow generally in a main flow direction from the first container end toward the second container end;
   a settler compartment provided as part of the container and adjacent the container end of the container;
   a first, organic phase, weir for organic phase material provided as part of the settler compartment; and
   a second, aqueous phase, weir for aqueous phase material provided as part of the settler compartment, wherein the second, aqueous, weir is defined at one end thereof by the rear container end wall, and the second, aqueous, weir comprises:
      a first partition having a lower first partition end connected to the bottom container wall, and the first partition projecting upwardly from the bottom container wall and spaced apart from the rear container end wall by a first distance;
      a second partition having a lower second partition end spaced above the bottom container wall, and the second partition projecting upwardly and spaced apart from the rear container end wall by second distance greater than the first distance; and
      a third partition having a lower third partition end connected to the bottom container wall, and the third partition projecting upwardly from the bottom container wall and spaced apart from the rear container end wall by a third distance, wherein the first partition has a height that is less than a height of the second partition, and wherein the third partition has a height that is less than the height of the first and second partitions, respectively, and wherein the second, aqueous, weir including the partitions, define a flow path for the aqueous phase material; and
   wherein the first, organic phase, weir comprises:
      a first organic weir wall having a bottom end spaced above the bottom container wall and extending upwardly, with the first organic weir wall being spaced from the rear container end wall by a fourth distance greater than third distance, and wherein the first organic weir wall has a height greater than the heights of each of the first, second and third partitions;
      a first organic weir bottom wall connected at a point of connection to the bottom end of the first organic weir wall, and angling upward therefrom in the direction opposite to the main flow direction; and
      a second organic weir wall projecting upwardly from the angled first organic weir bottom wall, wherein the second organic weir wall is spaced from the rear container end wall by a fifth distance greater than the fourth distance, and wherein the second organic weir wall has a height less than the height of the first organic weir wall.

2. The apparatus according to claim 1, further comprising a pivotally adjustable lip provided at the top of the first partition to direct flow over the top of the first partition.

3. The apparatus according to claim 2, further comprising a vertically adjustable lip located above the second organic weir wall and movable in a direction parallel with the second organic weir wall, and spaced from the second organic weir wall to form an organic phase material inlet for organic phase material between the second organic weir wall and the vertically adjustable lip and into the first, organic phase, weir.

4. The apparatus according to claim 2, further comprising an inclined plate located generally proximate the top of the second organic weir wall, and extending upwardly at an angle with respect to the second organic weir wall and towards the first organic weir wall.

5. The apparatus according to claim 2, further comprising a lip plate having a generally L-shaped cross section disposed adjacent the point of connection of the first organic weir wall and the organic weir bottom wall, and having a portion extending generally downwardly and a portion extending generally in a direction opposite to the main flow direction, wherein the lip plate is spaced above the bottom container wall of the container.

6. The apparatus according to claim 1, further comprising a vertically adjustable lip located above the second organic weir wall and movable in a direction parallel with the second organic weir wall, and spaced from the second organic weir wall to define an organic phase material inlet for organic phase material between the second organic weir wall and the vertically adjustable lip into the first, organic phase, weir.

7. The apparatus according to claim 6, further comprising an inclined plate located generally proximate the top of the second organic weir wall, and extending upwardly at an angle with respect to the second organic weir wall and towards the first organic weir wall.

8. The apparatus according to claim 1, wherein the point of connection of the first organic weir wall and the organic weir bottom wall is spaced above the container bottom wall to form an aqueous phase material inlet for aqueous phase material into the second, aqueous phase, weir.

9. The apparatus according to claim 8, further comprising a lip plate having a generally L-shaped cross section disposed adjacent the point of connection of the first organic weir wall and the organic weir bottom wall, and having a portion extending generally downwardly and a portion extending generally in a direction opposite to the main flow direction, wherein the lip plate is spaced above the bottom container wall of the container.

10. The apparatus according to claim 1, further comprising an inclined plate located generally proximate the top of the second organic weir wall, and extending upwardly at an angle with respect to the second organic weir wall and towards the first organic weir wall.

11. The apparatus according to claim 10, further comprising a lip plate having a generally L-shaped cross section disposed adjacent the point of connection of the first organic weir wall and the organic weir bottom wall, and having a portion extending generally downwardly and a portion extending generally in a direction opposite to the flow direction, wherein the lip plate is spaced above the bottom wall of the container.

12. The apparatus according to claim 1, further comprising a lip plate having a generally L-shaped cross section disposed adjacent the point of connection of the first organic weir wall and the organic weir bottom wall, and having a portion extending generally downwardly and a portion extending generally in a direction opposite to the main flow direction, wherein the lip plate is spaced above the bottom container wall of the container.

13. The apparatus according to claim 1, further comprising a material outlet disposed in the bottom wall in a location in between the rear container end wall and the first partition.

14. The apparatus according to claim 1, further comprising a mixer compartment.

15. An apparatus for liquid-liquid extraction configured to accommodate at least a first, organic, liquid phase and a second, aqueous, phase, the apparatus comprising:
   a container having a bottom container wall, a container end, with the second container end having a rear container end wall, wherein the container is adapted for material flow generally in a main flow direction from the first container end toward the second container end;
   a settler compartment provided as part of the container and adjacent the container end of the container;
   a first, organic phase, weir for organic phase material provided as part of the settler compartment; and
   a second, aqueous phase, weir for aqueous phase material provided as part of the settler compartment, wherein the second, aqueous, weir is defined at one end thereof by the rear container end wall, and the second, aqueous, weir comprises:
      a first partition having a lower first partition end connected to the bottom container wall, and the first partition projecting upwardly from the bottom container wall and spaced apart from the rear container end wall by a first distance;
      a second partition having a lower second partition end spaced above the bottom container wall, and the second partition projecting upwardly and spaced apart from the rear container end wall by second distance greater than the first distance; and
      a third partition having a lower third partition end connected to the bottom container wall, and the third partition projecting upwardly from the bottom container wall and spaced apart from the rear container end wall by a third distance, wherein the first partition has a height that is less than a height of the second partition, and wherein the third partition has a height that is less than the height of the first and second partitions, respectively, and wherein the second, aqueous, weir including the partitions, define a flow path for the aqueous phase material; and
   wherein the first, organic phase, weir comprises:
      a first organic weir wall having a bottom end spaced above the bottom container wall and extending upwardly, with the first organic weir wall being spaced from the rear container end wall by a fourth distance greater than third distance, and wherein the first organic weir wall has a height greater than the heights of each of the first, second and third partitions;
      a first organic weir bottom wall connected at a point of connection to the bottom end of the first organic weir wall, and angling upward therefrom in the direction opposite to the main flow direction; and
      a second organic weir wall projecting upwardly from the angled organic weir bottom wall, wherein the second organic weir wall is spaced from the rear container end wall by a fifth distance greater than the fourth distance, and wherein the second organic weir wall has a height less than the height of the first organic weir wall; and
   further comprising:
   a pivotally adjustable lip provided at the top of the first partition to direct flow over the top of the first partition;
   a vertically adjustable lip located above the second organic weir wall and movable in a direction parallel with the second organic weir wall, and spaced from the second organic weir wall to form an organic phase material inlet for organic phase material between the second organic weir wall and the vertically adjustable lip and into the first, organic phase, weir;
   an inclined plate located generally proximate the top of the second organic weir wall, and extending upwardly at an angle with respect to the second organic weir wall and towards the first organic weir wall; and
   a lip plate having a generally L-shaped cross section disposed adjacent the point of connection of the first organic weir wall and the organic weir bottom wall, and having a portion extending generally downwardly and a portion extending generally in a direction opposite to the main flow direction, wherein the lip plate is spaced above the bottom container wall of the container,
   wherein the point of connection of the first organic weir wall and the organic weir bottom wall is spaced above the container bottom wall to form an aqueous phase material inlet for aqueous phase material into the second, aqueous phase, weir.

16. The apparatus according to claim 15, further comprising a material outlet disposed in the bottom wall in a location in between the rear container end wall and the first partition.

17. The apparatus according to claim 15, further comprising a mixer compartment.

* * * * *